United States Patent [19]

Thompson

[11] Patent Number: 5,062,193
[45] Date of Patent: Nov. 5, 1991

[54] METHOD FOR MOUNTING AND DISMOUNTING RIGID SLEEVES ONTO AND FROM A CYLINDER

[75] Inventor: William L. Thompson, Vancouver, Wash.

[73] Assignee: International Composites Corporation, Vancouver, Wash.

[21] Appl. No.: 460,362

[22] Filed: Jan. 3, 1990

Related U.S. Application Data

[63] Continuation-in-part of Ser. No. 293,131, Jan. 3, 1989, Pat. No. 4,979,278.

[51] Int. Cl.⁵ ............................................. B23P 19/00
[52] U.S. Cl. .................................. 29/426.6; 29/426.1; 29/426.5; 29/450; 29/235
[58] Field of Search ...................... 29/895.211, 895.23, 29/426.6, 450, 505, 728, 234, 235, 282, 283.5, 426.1, 426.5; 269/47, 48.1; 101/375, 376

[56] References Cited

U.S. PATENT DOCUMENTS

| | | | |
|---|---|---|---|
| 2,645,004 | 7/1953 | Dorner | 29/234 |
| 3,022,573 | 2/1962 | Bullock | 29/235 |
| 3,146,709 | 9/1964 | Bass et al. | 101/375 |
| 3,453,718 | 7/1969 | Bates | 29/432 |
| 3,846,901 | 11/1974 | Lovett | 29/235 |
| 4,089,265 | 5/1978 | White et al. | 101/375 |
| 4,144,812 | 3/1979 | Julian | 101/382 |
| 4,144,813 | 3/1979 | Julian | 101/382 |

Primary Examiner—P. W. Echols
Assistant Examiner—David P. Bryant
Attorney, Agent, or Firm—Marger, Johnson, McCollom & Stolowitz, Inc.

[57] ABSTRACT

The invention relates to a device for axially, externally mounting a expandable sleeve onto, and dismounting a expandable sleeve from, a cylinder, comprises an external fluid-transmission means which comprises a plurality of sections. These sections are attachable and detachable from each other for facilitating engagement and disengagement of the external fluid-transmission means with respect to the sleeve. In one form of this invention, the external fluid-transmission means sections are connected to each other at one of its respective ends, typically pivotally connected to each other. The other end of each the fluid-transmission means sections are then movable in an arcuate path between a closed position in which the fluid-transmission means section ends are in engagement with each other, and an open position in which the fluid-transmission means section ends are in disengagement with each other. The external fluid-transmission means sections typically includes a collar body and internal bushing means, preferably an interchangable internal bushing means, for surrounding the sleeve.

6 Claims, 8 Drawing Sheets

METHOD FOR MOUNTING AND DISMOUNTING RIGID SLEEVES ONTO AND FROM A CYLINDER

This application is a continuation-in-part of copending patent application Ser. No. 07/293,131, filed Jan. 3, 1989, now U.S. Pat. No. 4,979,278.

BACKGROUND OF THE INVENTION

This invention relates to certain devices and methods for readily mounting expandable sleeves onto and dismounting expandable sleeves from printing cylinders, and more particularly to devices and methods for expandably mounting and dismounting expandable sleeves employing a pressurized fluid.

Expandable sleeves have been used in various prior art applications. For instance, in past printing operations, flexible printing plates were mounted onto the outer surface of a solid printing cylinder. These printing plates were used for printing of ink images onto a printing medium. Typically, the back of the plates were adhered directly to the printing cylinder. Since these plates were not readily interchangeable from one cylinder to another, the use of a multiplicity of printing cylinders to perform a multiplicity of jobs was required. This presented severe storage and cost problems to the end user.

Therefore, in an effort to overcome the above problems, printing sleeves were developed which were mountable onto and dismountable from printing cylinders. In order to accomplish such mounting and dismounting operations, the printing cylinders were modified at substantial cost to form an air-assisted construction capable of limited expansion of the printing sleeves.

The first patent to describe these new printing sleeves and complementary printing cylinders was U.S. Pat. No. 3,146,709. Compressed gas, generally compressed air, passing in a generally radial direction from holes located within the printing cylinders, was used to expand the sleeve to a limited extent for facilitating the mounting and dismounting operations. The outer wall of the cylinder has a slightly larger diameter than the inner wall of the sleeve, so that the sleeve will firmly frictionally fit onto the cylinder. The cylinder is hollow and has a cylindrical chamber which is used as a compressed air chamber. The printing cylinder typically comprises a cylindrical tube fitted with airtight endplates. A plurality of spaced-apart, radially-extending apertures are provided in the tube through which air from the chamber may pass for expanding the sleeve during mounting and dismounting operations. Air is introduced into the chamber through an air hose.

U.S. Pat. Nos. 4,144,812 and 4,144,813 provide noncylindrical printing sleeves and associated air-assisted printing rolls designed in a tapered or stepped-transition configuration, the change in the sleeve or printing cylinder diameter from one end to the other being progressive, i.e., increasing or decreasing according to the direction one is moving along the printing sleeve or roll. The printing roll comprises an outer surface having one end of a diameter greater than the other longitudinal end. The printing sleeve has an inner surface designed to form an interference fit with the outer surface of the printing roll only at the designated working position, and not along the entire axial uniform cross-sectional extent of the tapered sleeve. In this case, both the tapered sleeves and the corresponding tapered cylinders must be replaced at great cost to the user.

Finally, in U.S. Pat. No. 4,089,265, a flexographic printing roll is provided comprising a rigid base tube having perforations in the form of a plurality of small apertures and a printing sleeve on the tube strained to grip the tube to retain the sleeve securely on the tube. There is no underlying printing cylinder in the conventional sense in this system.

Today, all of the prior art hollow cylinders must be modified to an air-assisted configuration in order to accommodate the mounting and dismounting operations of the expandable sleeves. Costs for such modifications range from about $60 to $200 per cylinder. Plants which employ hollow such cylinders typically have 500 to 5,000 on hand. Therefore, the cost for making such modifications can range upwards of a million dollars for larger user facilities. Furthermore, if the end user has cylinders of a solid rather than a hollow configuration, they cannot be modified to an air-assisted structure. Instead, hollow replacement cylinders must be purchased at a cost of about $1,000 per cylinder.

Complete coverage of the external air holes in the air-assisted cylinder by the sleeve is required in normal operations in all of the above-described prior art systems. Such coverage is required in order to generate an air barrier between the printing sleeve and the printing cylinder for performing the subject mounting and dismounting operations. Therefore, full-length expandable sleeves are used in all the prior art printing sleeve systems in order to maintain the requisite air barrier effect.

Therefore, a need exists for a device and a method of mounting a expandable sleeve onto non-air-assisted printing cylinders, as well as on presently existing air-assisted printing cylinders, which eliminates the prior art requirement for high cost modification of the hollow cylinders to convert them into an air-assisted configuration, and which permits the mounting and dismounting operations to be effectively conducted without the expandable sleeve completely covering the cylinder outer surface during such operations.

SUMMARY OF THE INVENTION

This invention relates to mounting and dismounting devices and methods which overcome the above-described problems associated with prior art internally air-assisted cylinders. The subject devices and methods can be employed for mounting and dismounting expandable sleeves onto and from cylinders which are not of the air-assisted type, such as the less expensive solid cylinders and the like, thereby avoiding the expenses involved in modifying the cylinders. In another aspect of this invention, the expandable sleeves employed in conjunction with the external mounting device of this invention can have a longitudinal dimension which is less than the longitudinal dimension of the cylinder. Clearly, prior art air-assisted cylinders cannot affect mounting and dismounting operations unless the sleeve has a longitudinal dimension equal to the longitudinal dimension of the cylinder. Thus, by employing the device of this invention, mounting of a plurality of sleeves onto, and dismounting a plurality of sleeves from, the underlying cylinder can be provided. In this way, a sleeve can be positioned at any point along the cylinder. For example, a three-section sleeve can be employed for printing indicia onto various substrates. For instance, a first sleeve section can print the name of the manufacturing company, a second sleeve section can print the type or nature of such product, and a third sleeve section can print the size of such product. If the product size were changed, the third sleeve section only could be dismounted from the cylinder and an alternate third sleeve section could be mounted in its place. Thus, a series of replacement sections, or a combination of permanent and replaceable sleeve sections can be employed on a given cylinder to maximize sleeve interchangeability and cylinder use.

More specifically, the invention is directed to a device for axially and externally mounting an expandable sleeve onto, and dismounting the sleeve from, a cylinder. The subject device comprises an external fluid-transmission means for expanding the diameter of the expandable sleeve by introducing a fluid capable of expanding the sleeve between the inner surface of the sleeve and the outer surface of the cylinder. The requisite sleeve expansion is accomplished without transmitting fluid from within the cylinder during the mounting and dismounting operations. The sleeve is contractable by the removal of the fluid. More specifically, the external fluid-transmission means includes fluid entry means for introducing the fluid into the fluid-transmission means. Fluid entry means is in communication with a fluid transmission pathway which conveys the fluid from the fluid entry means to fluid-transmission interjection means. The fluid-transmission interjection means introduces the fluid between the cylinder and the sleeve for performing the sleeve expansion operation.

Typically, the fluid is pressurized for use in the mounting and dismounting operations, and preferably comprises a pressurized gas or liquid. The pressurized gas can comprise compressed air and the pressurized liquid can comprise a hydraulic fluid. The external fluid transmission means in the device preferably comprises a fluid transmission manifold including an interior portion which preferably engages an end of the sleeve. The manifold includes a fluid inlet means for transporting the fluid to within the interior portion of the manifold for introducing the expanding fluid between the sleeve and the cylinder. Preferably, the fluid is introduced between the sleeve and the cylinder in a direction between an axial direction and a radial direction, respectively, i.e., between about 0° and 90° with respect to the inner cylindrical surface of the sleeve.

The fluid transmission means of this invention can comprise a fluid transmission manifold which preferably engages the sleeve for introducing the fluid between the sleeve and the cylinder. The fluid transmission manifold preferably comprises fluid transmission collar means defining a central fluid transmission chamber sized to surround the end of the sleeve. Moreover, means can be provided within the collar for transporting the flow of the expanding fluid to the chamber for introduction between the sleeve and the cylinder. Preferably, the chamber means includes an internal recess sized to surround the end of the expanded sleeve and a plurality of apertures for introducing the expanding fluid between the sleeve and the cylinder.

The device can further include means for interlockingly connecting the fluid transmission means and the sleeve one to the other. The interlockingly connecting means can comprise means surrounding the second end of the sleeve and which interlocking attaches to the fluid transmission means. This maintains the sleeve in position with respect to the fluid transmission means for facilitating the introduction of the expanding fluid during the mounting and dismounting operations.

The device of this invention preferably comprises fluid transmission means comprising a fluid transmission collar means defining a central fluid transmission chamber sized to surround the end of the expanded sleeve. It may also include interlocking attachment means comprising a second collar means which surrounds the second end of the sleeve. Moreover, the device may include a plurality of connector means which interlockingly attaches the fluid transmission collar to the second collar for maintaining the sleeve in position for facilitating the introduction of the fluid during the mounting and dismounting operations.

In another aspect of this invention, the expandable sleeves employed in conjunction with the external mounting device of this invention can have a longitudinal dimension which is less than the longitudinal dimension of the cylinder. Clearly, prior art air-assisted cylinders cannot affect mounting and dismounting operations unless the sleeve has a longitudinal dimension equal to the longitudinal dimension of the cylinder. Thus, by employing the device of this invention, mounting of a plurality of sleeves onto, and dismounting a plurality of sleeves from, the cylinder can be provided.

Another preferred form of the device for axially, externally mounting a expandable sleeve onto, and dismounting a expandable sleeve from, a cylinder, comprises an external fluid-transmission means which comprises a plurality of sections. These sections are attachable and detachable from each other for facilitating engagement and disengagement of the external fluid-transmission means with respect to the sleeve. In this way, the external fluid-transmission means is more easily mountable and dismountable during use. It also allows a plurality of sleeves to mounted onto and dismounted from a single cylinder due to the attachability and detachability of the separate sections with respect to the cylinder. In one form of this invention, the external fluid-transmission means sections are connected to each other at one of its respective ends, typically pivotally connected to each other. The other end of each the fluid-transmission means sections are then movable in an arcuate path between a closed position in which the fluid-transmission means section ends are in engagement with each other, and an open position in which the fluid-transmission means section ends are in disengagement with each other.

The external fluid-transmission means sections typically includes a collar body and internal bushing means for surrounding the sleeve. The collar body defines an internal central chamber means therewithin. The internal bushing means is attached within this internal central chamber means. The internal bushing means preferably surrounds the sleeve during the mounting and dismounting operations, and is removably attached and detached to the collar body within the internal central chamber means. Thus, the removable bushing means can have inside diameters corresponding to the outside diameter either of the sleeve or of the sleeve and cylinder, respectively.

The device of the present invention can also include auxiliary means for facilitating mounting of the expandable sleeve onto, and dismounting the expandable sleeve from, the cylinder. Typically, the auxiliary fluid introduction means is engagingly and disengagingly attached to the cylinder thereby forming a substantially air-tight fit between the auxiliary fluid introduction means and the cylinder for externally introducing the expanding fluid between the sleeve and the cylinder. This is generally accomplished when external forces are applied to the auxiliary fluid introduction means which are sufficient to provide the air-tight fit. The auxiliary fluid introduction means preferably comprises a bushing housing assembly and an extender ring, respectively. The bushing housing is engagingly and disengagingly attached at one end substantially coaxially to the cylinder. It is also engagingly and disengagingly attached at the other end substantially coaxially to the extender ring. Accordingly, a substantially air-tight fit is formed between the extender ring and the cylinder for externally introducing the expanding fluid between the sleeve and the cylinder. To further facilitate this air-tight attachment, the bushing housing and the extender ring each include tapered end sections which are complimentary to each other for facilitating the substantially coaxial attachment between the bushing housing and the extender ring, respectively.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Referring now to FIGS. 1–4, a cylindrically-shaped expandable sleeve 10 is provided which comprises cylindrically-shaped inner and outer walls 12 and 14 which define a hollow inner chamber 16, and a pair of end sections 18 and 20. Sleeve 10 is depicted mounted onto a conventional solid, non-air-assisted printing cylinder 22.

Typically, sleeve 10 will serve as a support for the application of printing plates 24, preferably flexographic printing plates (see FIGS. 1 and 2 in phantom), which are generally made of a flexible polymeric material. Any suitable indicia for printing onto a printing medium may be set on these printing plates. Alternatively, outer wall 14 may itself be employed as the means for printing onto a printing medium. Various methods can be employed to engrave the outer wall 14. For example, one could employ chemical or photochemical engraving techniques to form the requisite means for printing the print indicia.

The expandable sleeve 10 and the printing cylinder 22 are cylindrical and have a constant diameter. The diameter of the outer wall section 26 of the printing cylinder is sized to receive expandable sleeve 10 having an inner wall surface 12 of substantially constant diameter. The magnitude of such inner wall 12 is slightly smaller than the diameter of the outer wall section 26 of the printing cylinder on which it will ultimately be mounted to promote an interference fit of the sleeve about the printing cylinder. The expandable sleeve is expanded using a pressurized gas to a cross-sectional diameter greater than the diameter of the printing cylinder employing the external sleeve mounting device of the present invention. The mounting and dismounting operations of the present invention can be readily accomplished using, for example, the laminate composite sleeve described in related, co-pending application U.S. Ser. No. 07/261,501, which is commonly assigned to the assignee of this application.

Figure 1:
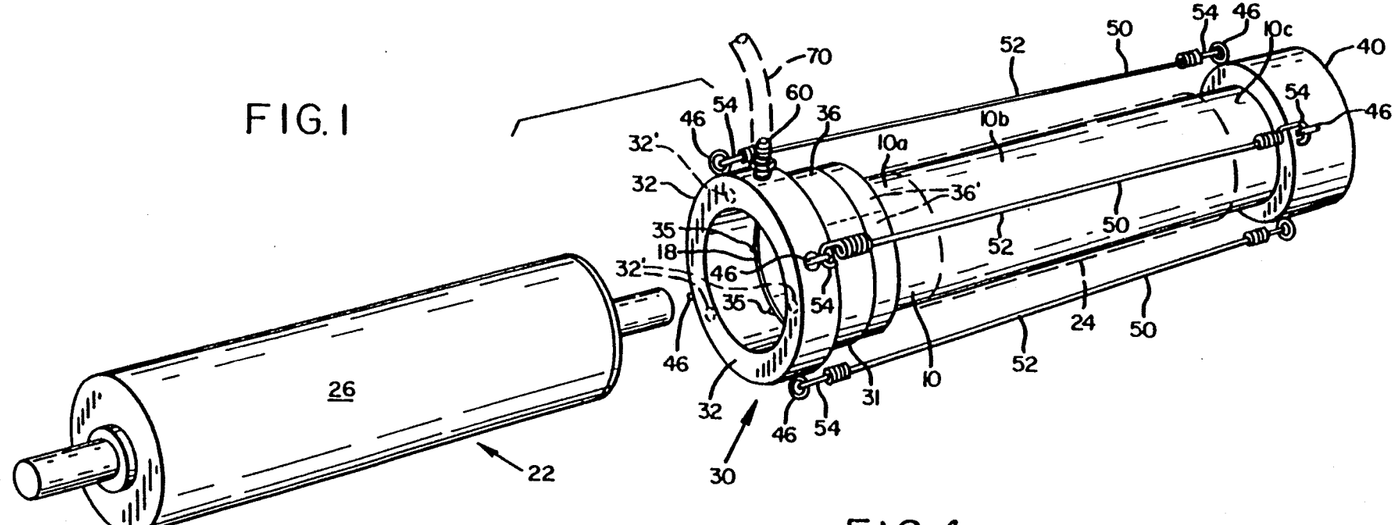
FIG. 1 is an exploded, perspective view of the external mounting and dismounting device of the present invention, with a expandable sleeve in position for mounting about a printing cylinder.
Figure 2:
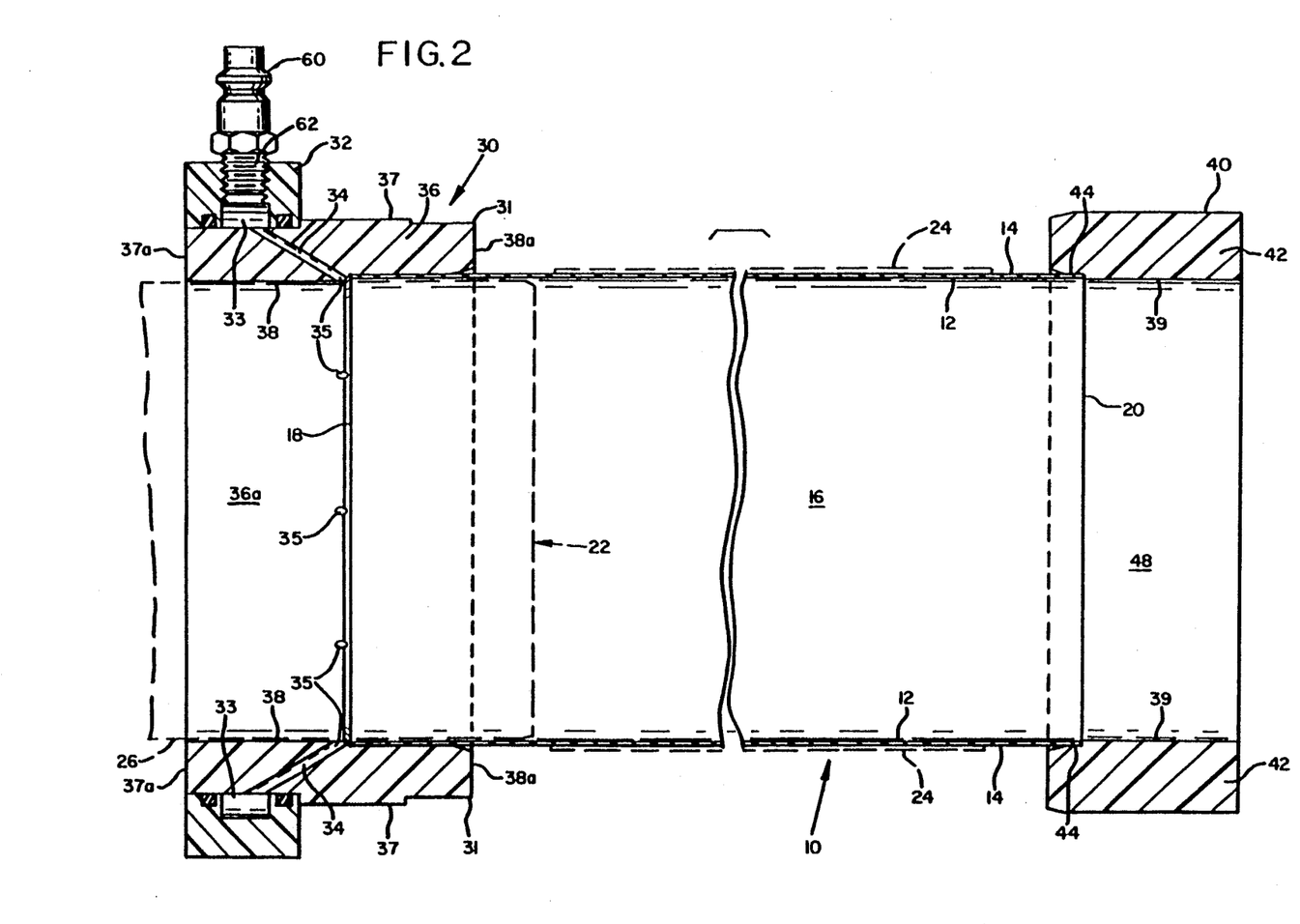
FIG. 2 is an enlarged, broken, sectional view of the device of FIG. 1, with the expandable sleeve and printing in mounting position therewith.

In order to expand sleeve 10, an external mounting device, generally denoted 30 in FIG. 1, is provided. Mounting device 30 comprises mounting collar 31 and co-acting positioning collar 40 connected, as shown in FIG. 2, to respective sleeve ends 18 and 20. Mounting collar 31 comprises a collar body portion 36 defining a hollow central chamber 36a, and having a connector ring 32 joined thereabout, generally located toward the outer end wall 37a. Collar body portion 36 includes outer body wall 37 and inner body wall 38, as well as outer end wall 37a and inner end wall 38a. An annular air inlet passageway 33 extends within connector ring 32. Positioning collar 40 comprises a collar body 42 having an internal annular recess 44 at one end of a central chamber 48. A plurality of attachment eyelets 46 are secured to each of the outer surface of connector ring 32 and positioning collar 40, respectively. In a further embodiment, such as in the case when sleeve segments 10a–10c (in phantom) are employed, collar body portion 36 comprises a pair of collar body sections 36'. The sections 36' are held in place by bolts 32' which pass through connector ring 32 and attach to the sections 36'. When the second segment 10b is moved onto the cylinder 26 adjacent to first segment 10a, collar body portion 36 becomes locked in position between segments 10a and 10b. In order to remove collar body portion 36 from the locked position, bolts 32' are removed from ring 32. Ring 32 is then detached from collar body portion 36 thereby allowing sections 36' to separated one from the other and removed from their location about sleeve 10.

Air fitting 60 is employed to transfer the fluid from a remote source (not shown) to hose 70 (in phantom) which is attached to air fitting 60. Air fitting 60 includes a threaded end 62. Connector ring 32 is sized to engagingly receive threaded end 62. Thus, air fitting 60 is fastened to connector ring 32 via the interconnection of the threaded end 62. Air fitting 60 is in communication with annular inlet passageway 33 for transferring the expanding fluid from hose 70. Thus, if air is the fluid of choice, an expansion air transmission manifold is formed in which annular inlet passageway 33 is in communication with intermediate annular channel 34, which in turn is in communication with a plurality of discharge outlet holes 35. If sleeve 10 is capable of being expanded by a gas, the preferred gas is compressed air. In this case, hose 70 is connected to an air compressor which transfers compressed air through the hose to air fitting 60 and into collar 31. On the other hand, when the sleeve cannot readily be expanded by a gas, due to its size or to an extremely high coefficient of expansion, it may require the use of a liquid expansion medium, such as a hydraulic fluid. In this latter instance, hose 70 can be connected to a hydraulic pump which transfers a pressurized hydraulic fluid to air fitting 60 for liquid expansion of the sleeve. The particular hydraulic fluid employed depends to a great extent on the structural nature of the sleeve and cylinder materials of construction. It is also subject to the environment used. For example, if the environment is a printing ink, water may be acceptable fluid but certain hydrocarbons would not because of there reactivity with the ink.

Figure 3:
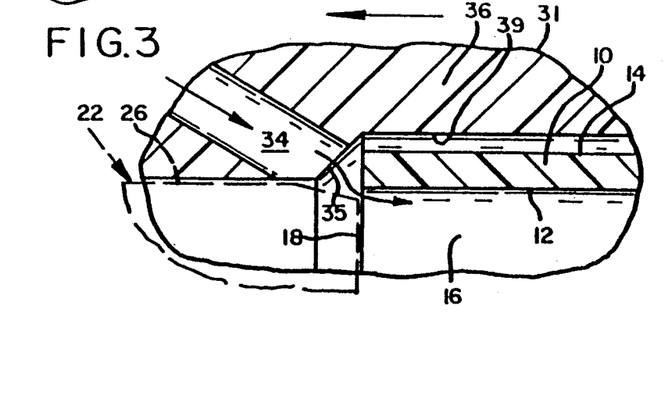
FIG. 3 is an enlarged, fragmentary, sectional view of the expansion fluid inlet portion of FIG. 2, with the expandable sleeve in the contracted position.
Figure 4:
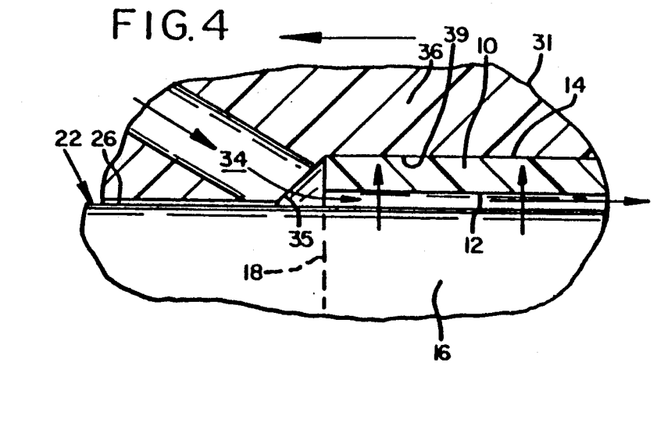
FIG. 4 is an enlarged, fragmentary, sectional view of the expansion fluid inlet portion of FIG. 2, with the expandable sleeve in the expanded position.

When the sleeve 10 is in position between collars 31 and 40, or with respect to collars 131 and 40, as depicted in FIGS. 3 and 4. First, air is delivered at the requisite expansion pressure through air hose 70 and into air fitting 60. The air then passes as indicated by the directional arrows through the continuous expansion air manifold defined by passageway 33, channel 34 and discharge outlet holes 35 and exit collars 31 at both open ends, i.e., the openings defined by outer and inner end walls 37a and 38a. To facilitate expansion of sleeve 10, it is first moved into sealing engagement with cylinder 22. This is accomplished by introducing cylinder 22 into hollow central chamber 36a and moving it toward sleeve 10. When sleeve 10 and cylinder 22 are in sealing engagement, the air exiting discharge outlet holes 35 and flowing out of the opening defined by outer wall 37a is interrupted, and is directed toward the opening in inner wall 38a. The air exiting discharge holes 35 is thereby directed so that it flows within hollow inner chamber 16 (see FIG. 3), and forms an air bearing between inner sleeve wall 12 and outer cylinder surface 26. At this point, sleeve 10 is expanded so that wall 14 is in communication with annular recess 39 (see FIG. 4). The expanded sleeve can now be readily axially moved on the externally-created air bearing to a position concentrically about a printing cylinder 22, which has not been modified to include internal air-assisted flow means for use in expanding the sleeve.

Therefore, the expanded sleeve 10 is contracted by discontinuing the expanding air flow. An interference fit is formed between the printing cylinder and the sleeve, respectively, so that the sleeve is frictionally mounted in a predetermined position on the printing cylinder. For dismounting purposes, the sleeve is expanded, as provided above, and then axially removed from its position about the printing cylinder.

In the embodiment shown in FIG. 1, sleeve 10 is fabricated to fit over the outer surface of the printing cylinder 22. However, the dotted line on sleeve 10 indicates sleeve sections 10a-10c which together fit over the entire outer surface of the printing cylinder 22. The primary use for a multiple section sleeve is in the case where a portion of the entire sleeve requires change. Thus, for instance, if a printing operation required only the plates in section 10a to be changed on a regular basis, then that section only could be removed and replaced using the external mounting device of the present invention. Sections 10b and 10c could remain in place on the printing cylinder without change during use. On the other hand, sections 10b and 10c could also be replaceable. This expedites the sleeve changing process and requires substantially less storage space for sleeves not in use. In some cases, a section of the sleeve can even be permanently affixed to the cylinder.

Figure 5:
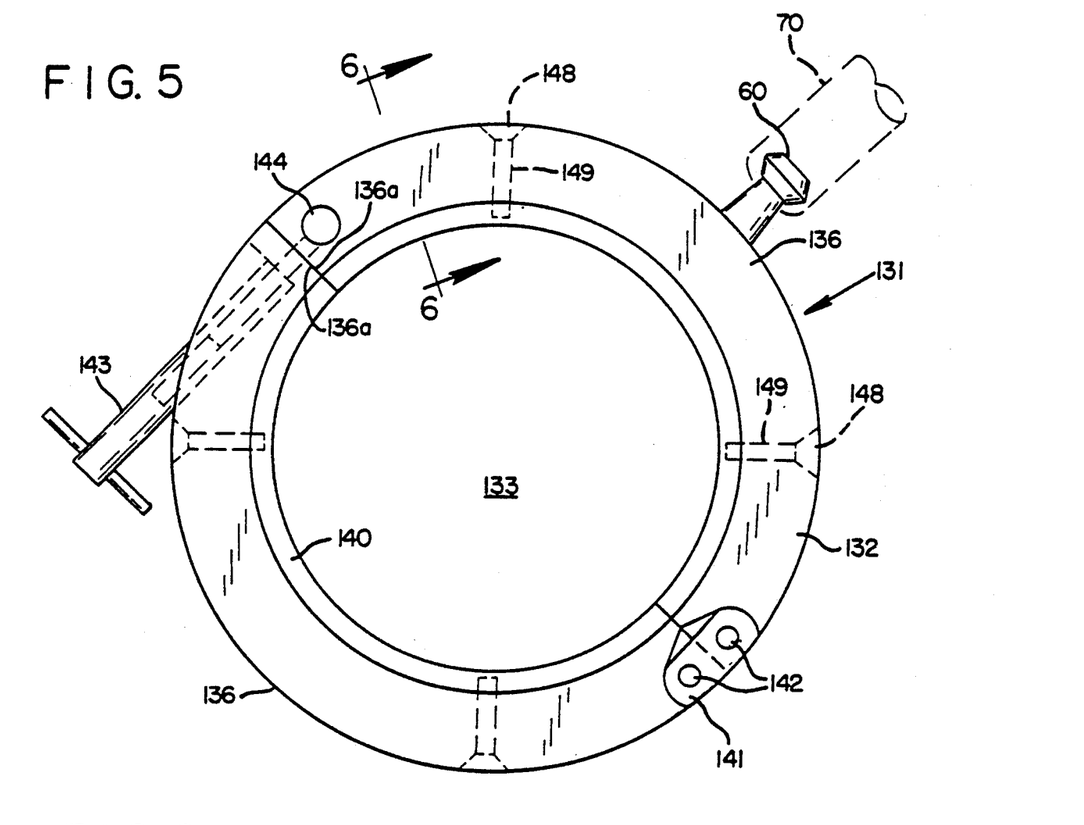
FIG. 5 is a plan view of mounting collar 130.
Figure 6:
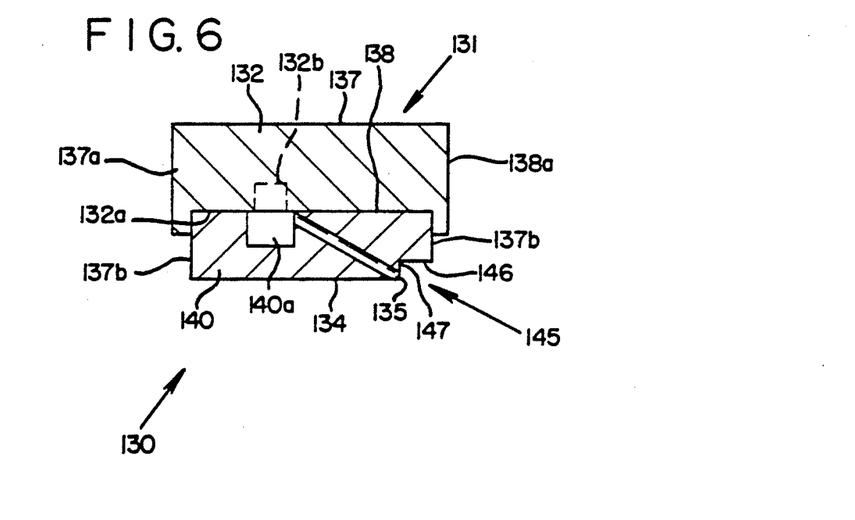
FIG. 6 is an enlarged sectional view taken along line 6—6 of FIG. 5.
Figure 7:
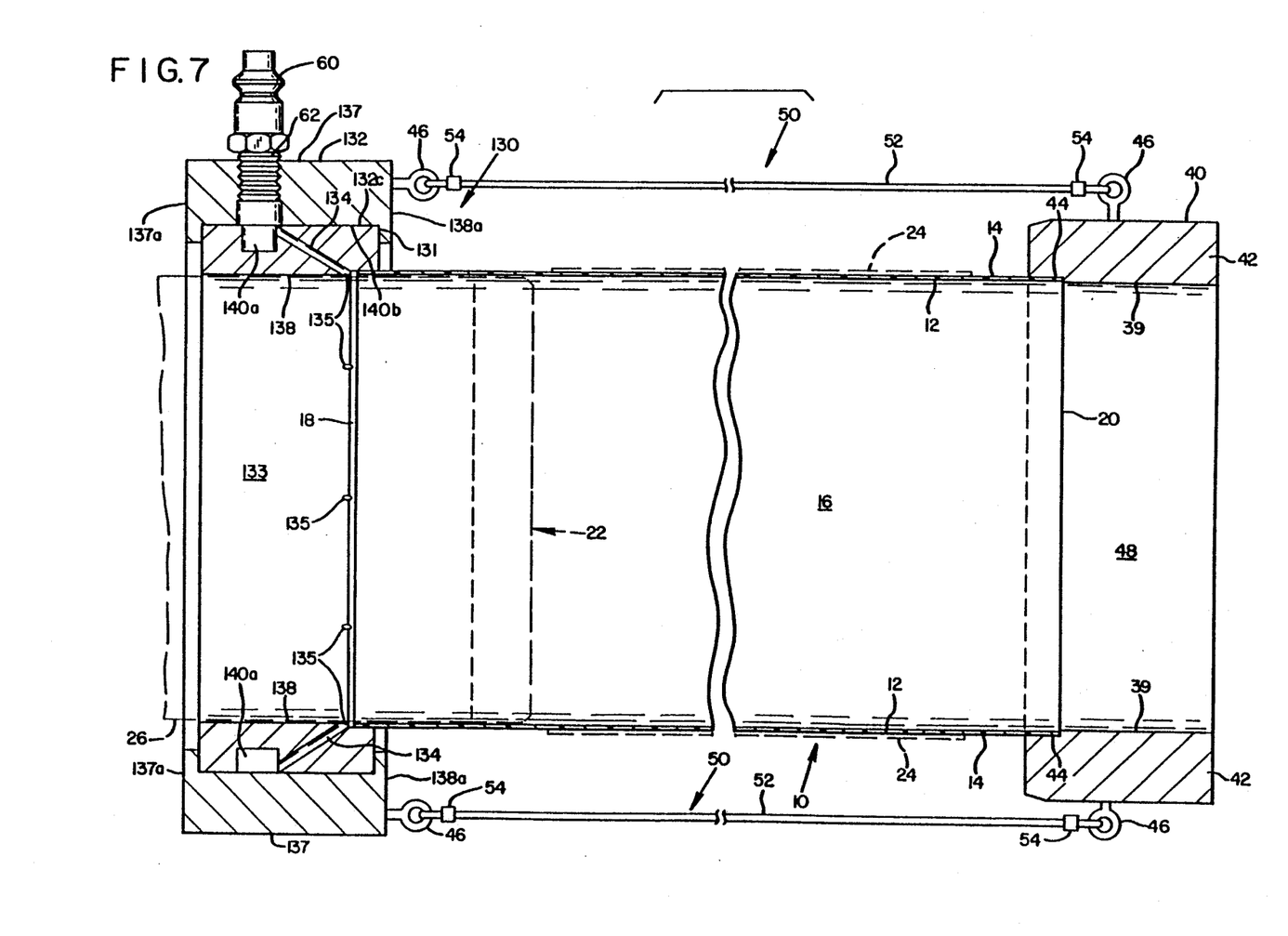
FIG. 7 is an enlarged, broken, sectional view of the device of FIG. 2 showing the mounting collar 130 of FIG. 5 in place about sleeve 10 instead of mounting collar 30.

Another external mounting device for mounting sleeve 10 onto cylinder 22 is generally denoted 130 in FIGS. 5-7. The external mounting device 130 comprises mounting collar 131 which includes a mounting collar body 132 and an interchangeable replaceable bushing section 140. Bushing sections 140 include an annular fluid passageway 140a disposed within inner annular wall. Mounting collars and positioning collar 40 may be employed alone or, mounting collar 131 and co-acting positioning collar 40 may be connected, as shown in the FIG. 7, to respective sleeve ends 18 and/or 20. Mounting collar body portion 132 defines an annular hollow central chamber 132a for inserting therein bushing sections 140. A pair of walls 137b, along with body wall 138, together define that central chamber 132a. It can also define an annular slot 132b (in phantom) for transporting expansion fluid. The collar 131 includes an annular body wall 137 and an inner annular body wall 138, as well as an outer annular end wall 137a and an inner annular end wall 138a. Positioning collar 40 can be fabricated as previously described herein.

Collar body portion 132 comprises a pair of collar body sections 136. The sections 136 are pivotally attached to each other by hinge assembly 141 via hinge pins 142, and are pivotally moveable between respective open and close positions. The sections 136 are held in place in a closed position, with section ends 136a in engagement with each other (see FIG. 6), by swing bolt 143. Swing bolt 143 can be pivotally moved between respective open and closed positions about bolt pin 144. The swing bolt 143 has a locking mechanism associated therewith to interlockingly maintain the swing bolt, and in turn the sections 136, in a closed position.

Bushing sections 140 are interchangeable and may be removed and replaced by a different I.D. bushing section depending upon the O.D. of the sleeve 10 to be mounted. Thus, bushing sections define annular recess 145, including recess portions 146 and 147, of different I.D. for receiving therewithin different O.D. sleeves 10. The dimension of recess portion 146 corresponds to the O.D. of sleeve 10 being employed in the mounting and dismounting operation. The dimension of recess portion 147 corresponds to the thickness of sleeve 10. The dimension of bushing surface 140c is determined by the O.D. of cylinder 22. In use, the sleeve 10 expansion operation for collar 30 is similar to previously described procedures which are depicted in FIGS. 1-4 regarding collar 30. In this way, bushing sections can be interchanged depending on the O.D. of sleeve 10 resulting in the ability to employ a single collar body 132 for a plurality of sleeves 10.

As shown in phantom in FIG. 5, a pair of holes 149 is tapped into each of sections 136 which extend from the outer annular surface into the bushing section 140. Threaded bolts are fastened within the confines of holes 149 for interlockingly attaching the bushing sections 140 within the cavities 133 of sections 136.

The transfer of expansion fluid therefore is provided from a remote source (not shown) through a hose, similar to hose 70 of FIG. 1, to air fitting 60. Air fitting 60 is in communication with annular inlet passageway 140a for transferring the expanding fluid from hose 70. When air is fluid of choice, an expansion air transmission manifold is formed in which annular inlet passageway 140a is in communication with bores 134, which in turn is in communication with the plurality of discharge outlet holes 135.

When using collar 131 and positioning collar 40 together for mounting operations, they can be held in position with respect to sleeve 10 by attachment means 50. As depicted in FIG. 7, attachment means 50 is in the form of expandable straps 52 having a pair of hooks 54 joined at its respective ends which are secured to eyelets 46 of collar 131 and positioning collar 40, respectively.

Figure 8:
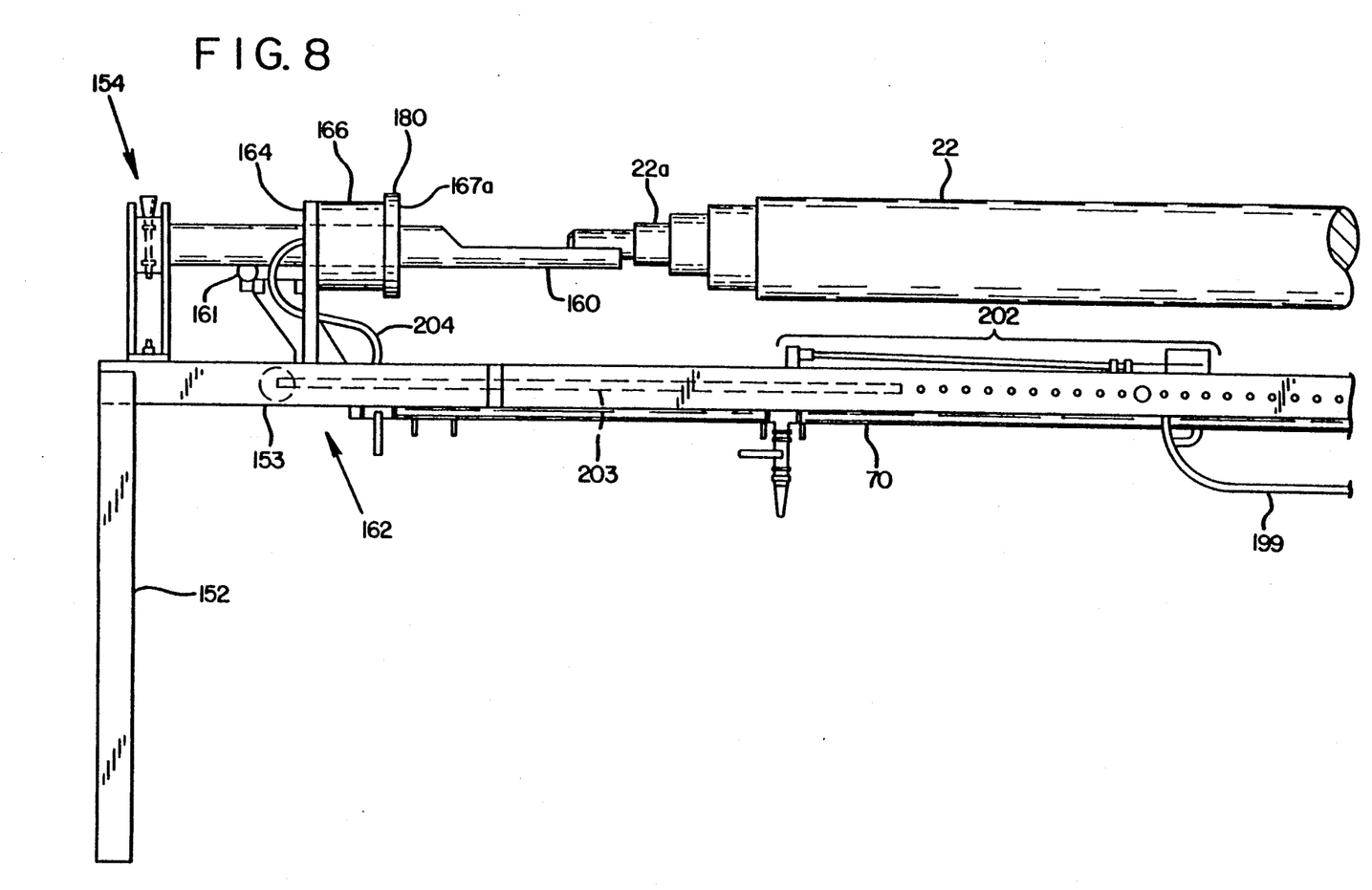
FIG. 8 is a side elevational view of the head stock end of the mounting/dismounting system 150.
Figure 9:
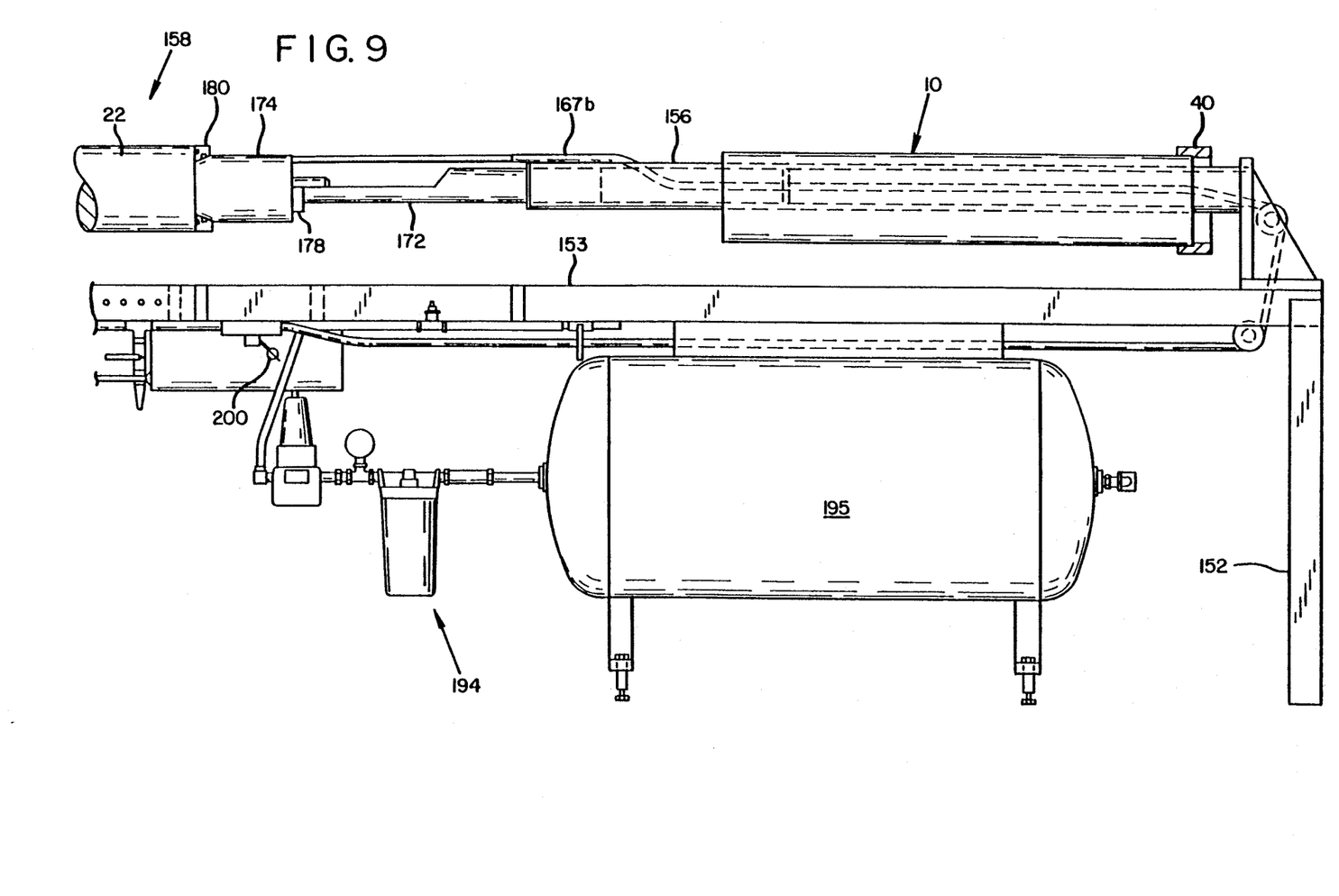
FIG. 9 is a side elevational view of the complementary tail stock end of the mounting/dismounting system 150 of FIG. 8.

In another preferred form of this invention, a system, generally denoted 150, for mounting and/or dismounting of one or more sleeves, having longitudinal dimensions equal to or less than the longitudinal dimension of cylinder 22, onto cylinder 22, is depicted in FIGS. 8 and 9. The system 150 includes a support frame 152, including a horizontal support bed 153, on which the dismounting/mounting components are supported. The system 150 includes vertically-extending head stock assembly 154 and a tail stock assembly 156, respectively, which are supported at their ends on horizontal support bed 153. Intermittent the assemblies 154 and 156 is located a cylinder loading area 158.

The upper end of head stock end assembly 154 is connected to and supports a first horizontal axle support assembly 160, which in turn is provided for supporting one end of the cylinder 22 during the mounting/dismounting operations. A carriage assembly 162 is mounted for movement in a reversible, horizontal path of travel on support bed 153 for engagement and disengagement with cylinder 22 during the sleeve mounting/dismounting operations. The carriage assembly 162 includes a vertical support section 164 to which is connected one end of a horizontally-extending bushing housing section 166. The bushing housing 166 defines a hollow central chamber 168 (see FIG 10) through which first horizontal axle support assembly 160 extends for providing the aforementioned cylinder support function. The other end of bushing housing 166 is attached to an extension ring 180. This provides a sealing surface in the course of dismounting sleeve 10 from cylinder 22. If required, extension ring 180 can also provide for a source of external pressurized air for assisting in the dismounting operation of sleeve 10.

At the tailstock end assembly 156, a second horizontal axle support assembly 172 for supporting the other end of the cylinder 22 during the mounting/dismounting operations is joined thereto. Support assembly 172 has a longitudinal dimension which is sufficient to maintain thereon sleeve(s) 10, mounting/dismounting collar 130 and positioning collar 40 during mounting/dismounting of one or more sleeves. A second bushing housing 166 and a second extension ring 180 are connected between the second end of cylinder 22 and the other end of second horizontal axle support assembly 172, for providing a source of external pressurized air for assisting in the mounting operation of sleeve 10. The O.D. of extension ring 180 corresponds to the O.D. of cylinder 22.

Figure 10:
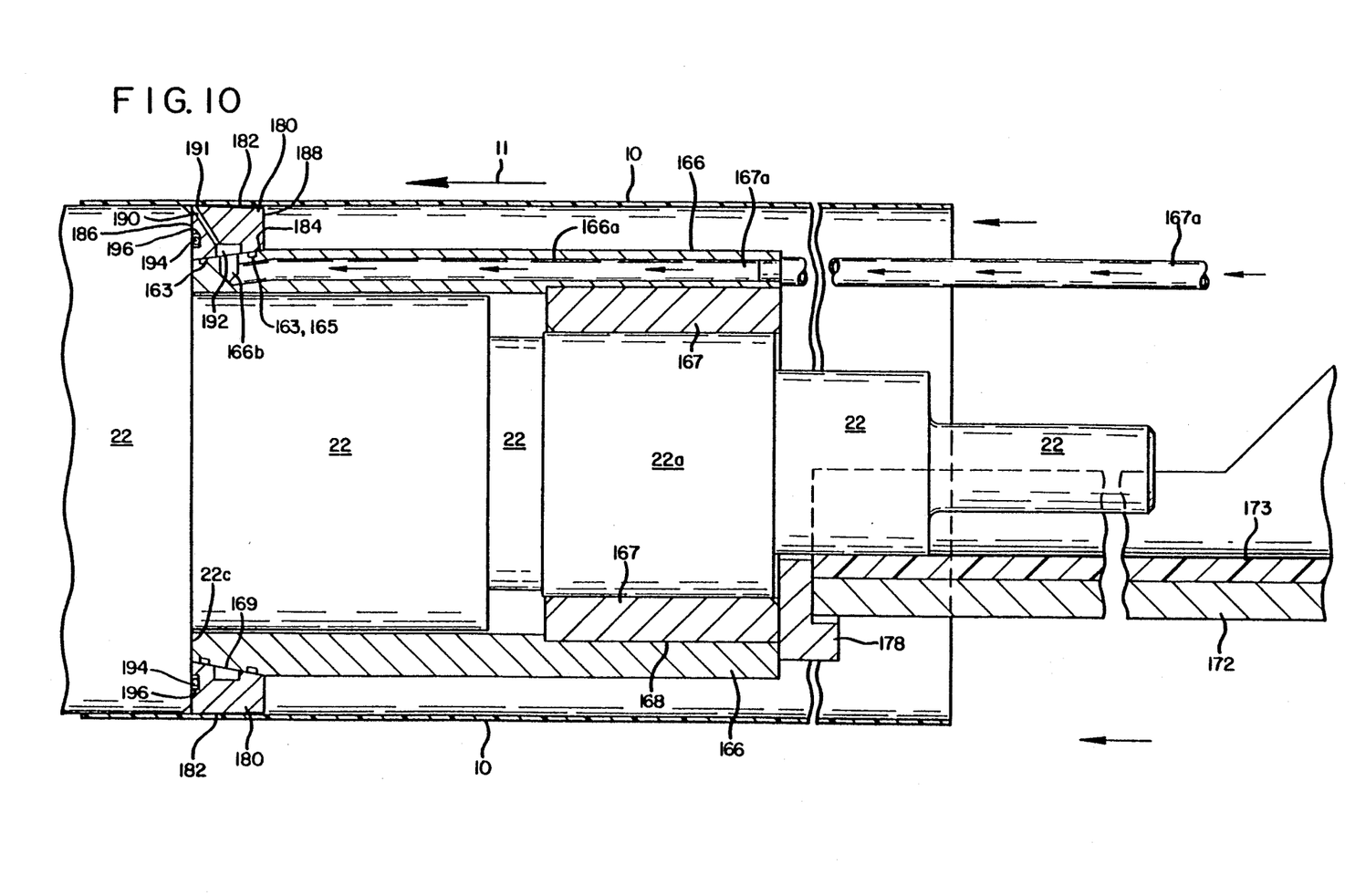
FIG. 10 is an enlarged sectional view of the bushing housing-extender ring assembly in place about cylinder 22.

Referring now to FIG. 10, a portion of the head stock end assembly is shown, for purposes of illustrating the mounting of a sleeve 10 in the direction of arrow 11 onto cylinder 22, employing for that purpose an extension ring 180. Cylinder 22 is supported at its outer end by axle support 172. For purposes of reducing wear and tear to cylinder 22 and axle support 170, respectively, a plastic insert 173 is provided on which cylinder 22 rests during the mounting and dismounting operations. In position for mounting sleeve 10 on cylinder 22, bushing housing 166 including a guide bushing portion 167 is in position about cylinder 22 with guide bushing 167 in fitting engagement with bearing surface 22a of cylinder 22. In this way, guide bushing 167 is employed to center bushing housing 166 on bearing surface 22a thereby facilitating a coaxial fit of bushing housing 166, and in turn extension ring 180, with respect to cylinder 22. Thus, the outer end 186 of extension ring 180 is in communication with the end 22c of cylinder 22 to facilitate the uniform, air-tight fit of the extension ring 180 and cylinder 22 when external forces applied to the respective ends of cylinder 22 by retention clip 178 and vertical support 164, respectively, are sufficient to provide said uniform air-tight fit.

To facilitate the engaged positioning of cylinder 22 with respect to axle support assembly 172, a retention clip 178 is positioned between the end of axle support assembly 172 and the end of bushing 167.

Bushing housing 166 includes a tapered outer surface 169 at one of its ends. The reason for this taper is for purposes of facilitating a friction fit between bushing housing 166 and extension ring 180. Extension ring 180 tapered section 169 is provided with annular grooves 165 which include O-rings 163 for providing a fitting seal between extension ring 180 and bushing housing 166. Bushing housing 166 includes a channel 166a into which an air line 167a extends. The air line 167a is attached to a source of pressurized air (not shown) at one end, and at the other end is in communication with an aperture 166b located within the tapered section of bushing housing 166. Extender ring 180 comprises an outer surface 182, which is complementary with the O.D. of cylinder 22, and a tapered inner surface 184 which is complementary with tapered end 169 of bushing housing 166. Extender ring 180 also includes an inner end section 188 and an outer end section 186. Inner side 184 includes an annular channel 192 which is in communication with and is complementary to aperture 166b of bushing housing 166. A series of bores 190 extend from holes 191 in outer surface 182 into and communicates with annular channels 192 of extender ring 180. For purposes of providing fittingly air tight engagement between outer surface 186 of extension ring 180 and surface 22c of print cylinder 22, an annular groove 193 is provided in outer surface 186 and an O-ring 194 is disposed within annular groove 196.

Figure 11:
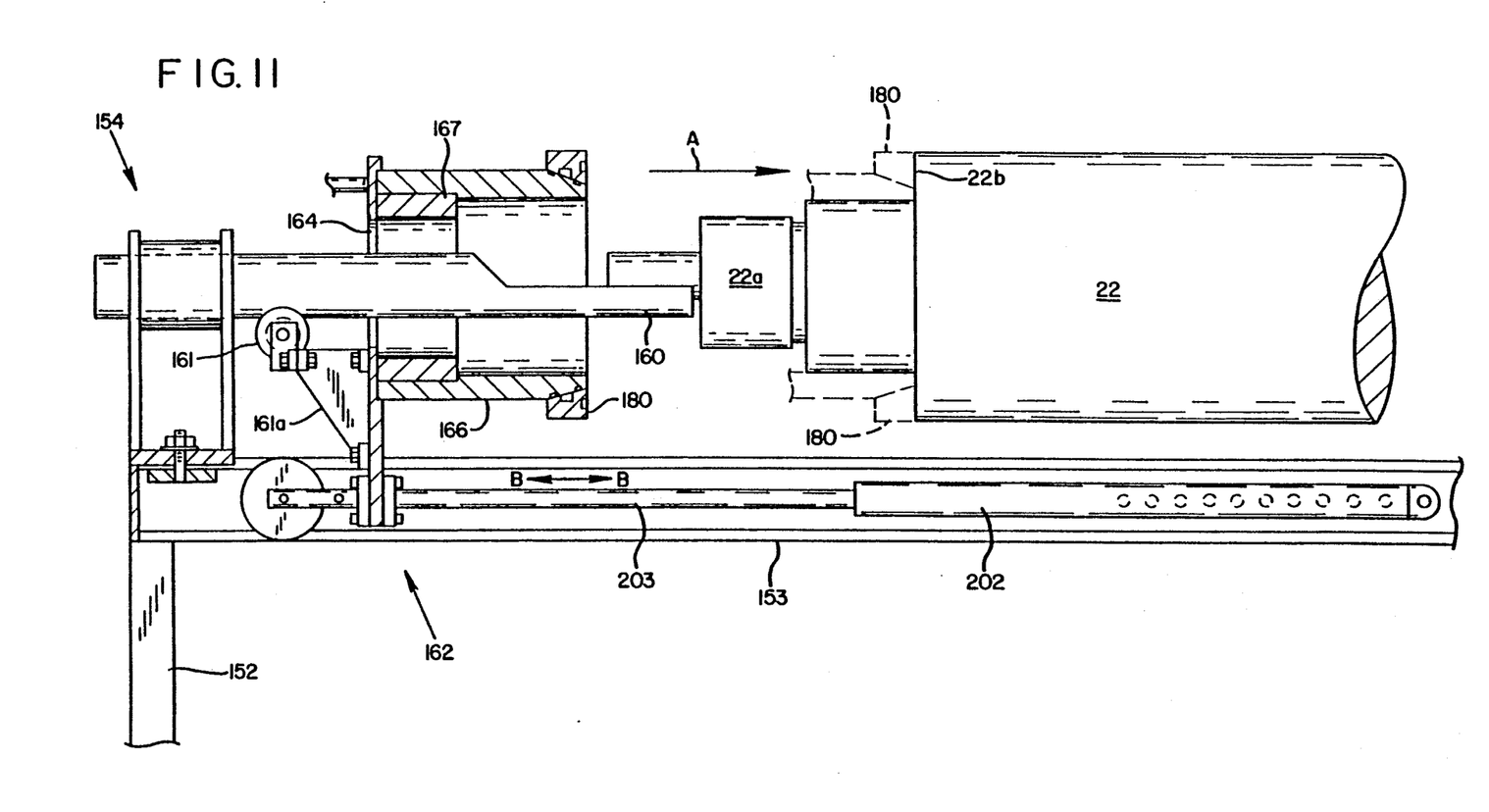
FIG. 11 is an enlarged, sectional view of the carriage assembly and the hydraulic/pneumatic actuator system therefor.

The headstock end assembly 154 is more specifically shown in FIG. 11. Carriage assembly 162, including vertical support 164, bushing housing 166 and extender ring 180, respectively, is horizontally movable along a conventional dual-railed track system (not shown) located on bed 153. Carriage assembly 162 is moveable between an extended position in which the cylinder 22 can be removed from the axle supports 160 and 172, and a retracted position in which extender rings 180 engage the respective end portions 22b and 22c of cylinder 22.

Vertical support 164, reinforced by gusset 161a, is connected at its lower end to ram member 202 for movement between the aforementioned retracted and extended positions along the track system. Support roller 161 is connected for back-and-forth movement in a horizontal path along axle support 160. Ram 202, including an arm 203 movable in a back-and-forth horizontal direction between an extended position and a retracted position (see bidirectional arrow B), is powered by a conventional air-over-oil, pneumatic-hydraulic system 194 (see FIG. 9). The extension and retroactive operations can then be accomplished through the use of system 194.

Following is the exemplary procedure for mounting one or more sleeves 10 of predetermined length onto a cylinder 22 of the same or greater predetermined length. An extension ring 180 of proper size is selected and placed on the tapered end 169 of bushing housing 166. Carriage assembly 162 is moved to an extended position. The sleeve(s) to be mounted are then loaded onto the axle support assembly 172 and the desired cylinder 22 is placed onto the plastic inserts 173 of axle supports 160 and 172, respectively. At the tail stock end of system 150, extension ring 180 and bushing housing 166 are manually or mechanically positioned. Retention clip 178 is the installed between the outboard end of the bushing housing 166 and inboard end of the axle support 172, thereby limiting axial movement of the cylinder 22.

At the head stock end 154, an extension ring 180 and bushing housing 166 are manually or mechanically positioned on the other axle of printing cylinder 22 so that the extension ring 180 contacts the end face 22b of the printing cylinder 22. Sufficient force is applied to axially move the print cylinder to achieve a tight contact between the cylinder and the extension ring on both ends 22b and 22c of the cylinder 22. The extension ring-bushing housing is held in this closed position by the mechanical hydraulic action imparted to carriage assembly 162 by ram member 202.

The sleeve 10 to be mounted is then manually engaged over the extension ring 180 and about ½" onto the end of the cylinder 22. Air from the air receiver 195 is introduced from the previously described air supply system (see FIG. 9), and ultimately through air line 167a passing within channel 166a and into aperture 166b of bushing housing 166. The air then flows into annular groove 192 and bores 190 of extension ring 180 and exits through holes 191 drilled in the circumference of the ring. The escaping air from holes 191 produces an air bearing between the O.D. of the extender ring 180 and cylinder 22 and the I.D. of the sleeve 10, which allows the user to move the sleeve to its requisite position about cylinder 22.

Following is an exemplary procedure for dismounting one or more sleeves 10 from a cylinder 22. The print cylinder with mounted sleeve(s) is placed on the axle supports 160 and 172. As provided above in the mounting procedure, the extension ring 180 and bushing housing 166 are positioned at the tail stock end 156, the retention clip 178 is installed to limit cylinder axial movement, and the extension ring and bushing housing are positioned at the head stock end 154. The carriage assembly 162 is then moved to a retracted position so that system 150 is in a closed position. The collar 130 is then installed about extension ring 180 or print cylinder 22, as required, to be in position surrounding sleeve 10 at the head stock end 154. Thus, collar 130 is opened about its hinged connection and placed over the O.D. of the extension ring 180 or the end of sleeve 10. The hinged sections 136 are then moved so that end sections 136a engage one another and locked in position by securing swing bolt 143 in a closed position forming a complete annular member about extension ring 180 or about sleeve 10. Air is introduced through line 70 to the air fitting 60, expanding sleeve 10, and the expanded sleeve is then moved axially toward the tail stock end. In this way, the sleeve(s) can be fully removed from a position around the cylinder.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for axially dismounting a rigid sleeve from a cylinder, said sleeve having a longitudinal dimension which is less than or equal to the longitudinal dimension of said cylinder, which comprises:

providing said sleeve and said cylinder, said sleeve having a first and a second end and being mounted onto said cylinder;

providing an external source of expansion fluid comprising two semicircular sections which are attachable and detachable from each other for facilitating engagement and disengagement of said external source of expansion fluid with said sleeve, said external source of fluid including a channel for introducing expansion fluid to the interior of said sleeve for expanding the diameter of said sleeve;

detaching said semicircular sections in preparation for installation of the same about said sleeve and cylinder;

attaching said semicircular sections together, with said sleeve contained therewithin, such that said channel is aligned with said sleeve and said cylinder to ensure that said expansion fluid will be introduced between said sleeve and said cylinder;

expanding the diameter of said sleeve by introducing said expansion fluid, from said external source of fluid to the interior of said sleeve; and moving said sleeve axially from about said cylinder.

2. The method of claim 1, wherein, prior to dismounting said sleeve from said cylinder said sleeve is mounted onto said cylinder, said mounting step comprising:

attaching said semicircular sections about a first end of said sleeve, said semicircular sections combining to form a collar body and an internal bushing for surrounding said sleeve, said collar body defining an internal central chamber therewithin and said internal bushing being attached to said collar body within said internal annular central chamber;

engaging an end of said cylinder with said first end of said sleeve;

expanding the diameter of said sleeve by introducing said expansion fluid from said external source of expansion fluid to said cylinder between an inner surface of said sleeve and an outer surface of said cylinder; and mounting said expanded sleeve axially about said cylinder.

3. The method of claim 2, wherein said collar body is comprised of first and second semicircular sections, each with first and second ends, said first and second semicircular sections being pivotally connected to each other at their respective first ends, the respective second ends being movable in an arcuate path between a closed position in which said second ends are in engagement with each other, and an open position in which said second ends are in disengagement from each other, said first and second semicircular sections including a channel for introducing said expansion fluid to the interior of said sleeve for expanding the diameter of said sleeve.

4. The method of claim 3, wherein said first and second semicircular sections are pivotally connected to each other at said first ends by hinge means.

5. The method of claim 2, wherein said internal bushing has an inside diameter equal to the outside diameter of the sleeve.

6. The method of claim 2, wherein a plurality of sleeves are mounted onto said cylinder.

* * * * *